United States Patent Office 3,122,483
Patented Feb. 25, 1964

3,122,483
STRONTIUM ION TOOTHPASTE
Murray W. Rosenthal, East Brunswick, N.J., assignor to Block Drug Company, Inc., Jersey City, N.J., a corporation of New Jersey
No Drawing. Filed July 21, 1960, Ser. No. 44,246
11 Claims. (Cl. 167—93)

The present invention relates generally to an improved dentrifice, and in particular it relates to an improved paste dentrifice effective in the treatment of hypersensitive dentin.

The condition known as hypersensitive dentin is quite prevalent. It may exhibit itself in response to various external stimuli on the surface of the teeth such as thermal changes, tactile stimuli, high osmotic pressures in the oral cavity, changes in pH, and other common circumstances virtually impossible to avoid. The problem is especially acute in adults who have lost some of the normal protective enamel sheathing on tooth surfaces because of erosion, abrasion, caries, chipping of the enamel, or in whom recession of the gingiva has exposed tooth dentin and cementum. However, certain stimuli such as cold, heat, and high sugar concentrations may evoke a painful response in children's teeth even when the teeth are in sound condition and the protective enamel tooth covering is still intact. The causes of painful hypersensitive dentin have never been completely explained since it has been demonstrated that calcified tooth structure itself does not contain nerve fiber. However, a generally accepted theory is that the dentinal tubules and odontoblastic fibrils in dentin, the normal functions of which are to produce calcified compounds in the tooth structure, are capable of transmitting neural impulses from the tooth structure to the dental pulp, which contains extremely sensitive nerve cells. The dentinal tubules and odontoblastic fibrins account in large part for the organic fraction of tooth dentin. It is known that both immature enamel and immature and mature dentin are higher in organic content than mature enamel, and thus probably have a higher content of dentinal tubules and odontoblastic fibrils than tooth enamel for the transmission of the above mentioned neural impulses. This circumstance would explain the greater sensitivity of immature teeth and exposed dentin in mature teeth.

Many methods have been proposed for the treatment of hypersensitive dentin. Some of these include sodium fluoride solution, sodium silicofluoride solution, zinc chloride solution, formaldehyde solution, concentrated glycerin, silver nitrate solution, and other agents. However, all these proposed therapies suffer from one disadvantage or another. Some are potentially toxic to the user if accidentally ingested in large doses; others are tissue denaturants or coagulants to be used with great caution and only under professional supervision, and others may discolor the teeth. None are believed to be suitable for incorporation into a toothpaste for home use which would be effective, stable, and safe for continued periods of time.

It is, therefore, a principal object of the present invention to provide an improved dentifrice.

Another object of the present invention is to provide an improved paste dentifrice effective in the treatment of hyper-sensitive dentin.

Still another object of the present invention is to provide paste dentifrice compositions which will carry solutions of strontium compounds capable of releasing strontium ions to the calcified structures of the human teeth.

A further object of the present invention is to provide a means for individuals to bring into contact with their teeth a source of strontium ions by use of a water-containing toothpaste containing solutions of water-soluble strontium compounds.

Still a further object of the present invention is to provide novel compositions of matter in the form of toothpastes which will allow the calcified tissues of the human mouth to adsorb strontium ions from solutions of water-soluble strontium compounds contained in the toothpaste.

An additional object of the invention is to provide a convenient, rapid, non-toxic, therapeutic method for the daily treatment and control of painful dentin, commonly known as hyper-sensitive dentin, by use of a toothpaste which releases strontium ions from solutions of water-soluble strontium compounds contained in the toothpaste during normal toothbrushing procedures.

Other objects and advantages of the invention will be apparent to those skilled in the art.

It has been discovered that solutions of water-soluble strontium compounds are particularly suitable for the therapy of hyper-sensitive dentin and are non-injurious to the tissues of the mouth. When applied to tooth surfaces, it is believed that an adsorption of strontium ions occurs on the odontoblastic fibrils or in the dentinal tubules thus blocking the transmission or neural impulses from the dentinal surface to the dental pulp. Since strontium ion is a normal constituent of tooth structure and since it has extremely low local and systemic toxicity, it is believed that this observation provides a useful therapeutic means for the dentist to control hypersensitive dentin by the application of simple water-soluble strontium compound solutions to the teeth of his patients.

The use of a surface active wetting agent with the water soluble strontium compound contained in the toothpaste has been found to be highly desirable, particularly when such wetting agent is a foaming type of detergent. In addition to serving the purpose of cleaning the teeth, the detergent enhances the effectiveness of the strontium ion as a desensitizing agent by facilitating penetration of strontium ions into tooth structure. The water-soluble strontium compound is advantageously incorporated along with the wetting agent, in a toothpaste which includes enough water to dissolve a substantial percentage, or all, of the water-soluble strontium compound, a polishing agent and certain other ingredients including bodying and gelling agents, and other additives.

The incorporation of water-soluble strontium compounds in common water-containing toothpaste formulations so that treatment for hypersensitive dentin can be continued away from the dental office, however, has heretofore proven to be wholly unsuccessful because of the highly reactive chemical nature of the strontium ion. Most commercial dentifrices are formulated with inorganic chemical polishing agents of low solubility in which the cation is an alkaline earth metal such as calcium or magnesium. Calcium phosphates, calcium carbonate, calcium sulfate, magnesium hydroxide, magnesium phosphates, and magnesium carbonate are examples of commonly used polishing compounds. It is not feasible to incorporate water-soluble strontium compounds into water-containing toothpaste formulations of this nature because of the chemical reaction which will occur between the strontium ions from the water-soluble strontium compound and the anions of the alkaline earth metal polishing agent in the presence of water contained in the toothpaste with eventual partial to complete precipitation and removal from therapeutic utility of the originally soluble strontium compound.

Furthermore, the foaming agents used in normal toothpaste formulations are surface active wetting agents which are usually anionic in nature, consisting of long-chain fatty acid or fatty alcohol derivatives including simple alkalifatty acid soaps, and fatty acids or alcohols etherified, esterified, or condensed with sulfates, phosphates, amino acids, polyalkylene oxides, or conjugated cyclic derivatives. Strontium ions will react with many of these surfactants in the presence of water contained in a toothpaste to produce insoluble strontium derivatives which can not then provide the cleansing and foaming action desirable in toothpastes after storage for prolonged periods.

In addition, many of the bodying and gelling agents employed in conventional toothpaste formulations are alkali-metal salts of high molecular weight carbohydrate or cellulosic polymers containing terminal carboxylic or sulfonic acid groups. These agents are not suitable for use with water-soluble strontium compounds held in solution because of the eventual reaction between the acid radicals with the strontium ion in the presence of water contained in the toothpaste, resulting in a loss of bodying properties in the finished toothpaste.

It has been found to be essential, therefore, to incorporate the water-soluble strontium compounds into water-containing toothpastes in which all major components are compatible with the strontium compounds; that is, that such toothpaste components will neither render inactive nor precipitate the strontium ion and the word compatible will herein be used in such sense both in the specification and in the appended claims. Examples of compatible polishing agents which have been employed for the purpose include strontium phosphates, strontium carbonate, micronized silica, and aluminum hydroxide. Examples of surface-active foaming agents which have been employed, demonstrating a high degree of compatibility with water-soluble strontium compounds, include the polyoxyethylene partial esters of polyhydric fatty acid derivatives, polyoxyethylene polyoxypropylene condensates, polyoxyethylene-fatty alcohol ethers, fatty acid N-methyl taurine condensates, and the like. Examples of compatible bodying agents which have been used include methylcellulose, hydroxyethylcellulose, and very high molecular weight polyoxyethylene polymers.

Other constituents incorporated in the water-containing toothpastes must also be compatible with water-soluble strontium compounds. For that reason, sodium benzoate is not used as a preservative since it will react with strontium ions in the presence of water contained in the toothpaste to produce an insoluble precipitate. Ascorbic acid, sodium bicarbonate, sodium N-lauroyl sarcosinate, sodium oxalate, sodium lauryl sulfate, sodium fluoride, stannous fluoride, diammonium phosphate, water-soluble chlorophyllins, antibiotics with free carboxylic groups, and many other compounds which have been suggested for toothpaste formulation, are similarly unusable because of their potential reaction and precipitation with strontium ion in the presence of water contained in the toothpaste.

Examples of water-soluble ionic strontium compounds that may be employed satisfactorily for the present purpose include strontium chloride, strontium acetate, strontium bromide, strontium lactate, strontium iodide, strontium nitrate, and strontium salicylate. However, the choice of the particular anion in the original dry strontium compound will be apparent from the above to those skilled in the art. The limiting circumstances are that the strontium compound used be non-toxic, that it be water-soluble, that it can be dissolved in the water contained in the toothpaste, and that it contribute strontium ions to the aqueous solution in which it is used. When the term "ionic" strontium compound is employed, what is meant is a strontium compound which provides strontium ions when in aqueous solution. When the term "water-containing" toothpaste is employed, what is meant is a dentifrice in semi-solid or viscous, liquid form which has been compounded with enough water to dissolve a substantial percentage or all of the strontium compound contained therein.

The concentration of the strontium ions employed in compatible toothpaste compositions should range from between about 0.5% to 10.0% and the surface-active wetting agent from about 0.5% to 5.00%. Concentrations of strontium ions lower than the stated minimum will have little effect in relieving hypersensitive dentin. Amounts in excess of 10% will result in salty and bitter toothpastes, rendering them unpalatable, although not detracting from their therapeutic utility. More particularly, it has been found that the range of 2.0% to 5.0% of strontium ions and 1.0% to 3.0% of the wetting agent to be preferable concentrations to exert the desired therapeutic effect. The compatible polishing agent should preferably be present by weight between about 10% and 50%. The amount of water used in the toothpaste composition should be great enough to dissolve a therapeutically active concentration of the water-soluble strontium compound within the limits set forth above.

As examples of toothpastes in accordance with the present invention, the following are offered for illustrative purposes, percentages being given by weight:

EXAMPLE 1

| | Percent |
|---|---|
| Strontium chloride.6 $H_2O$ | [1] 10.0 |
| Water | 36.2 |
| Glycerin | 25.0 |
| Hydroxyethylcellulose | 1.6 |
| Polyoxyethylene sorbitan monolaurate | 2.0 |
| Micronized silica | 24.0 |
| Spearmint oil | 1.0 |
| Saccharin | 0.2 |

[1] Equivalent to 3.3% strontium ion concentration.

EXAMPLE 2

| | Percent |
|---|---|
| Strontium lactate.3 $H_2O$ | [1] 8.0 |
| Water | 36.2 |
| Strontium carbonate | 15.0 |
| Sodium N-lauryl N-methyltaurate | 2.5 |
| Sorbitol | 20.0 |
| Micronized silica | 15.0 |
| Methylcellulose | 2.0 |
| Peppermint oil | 0.8 |
| Dulcin | 0.5 |

[1] Equivalent to 2.6% strontium ion concentration.

EXAMPLE 3

| | Percent |
|---|---|
| Strontium acetate.½ $H_2O$ | [1] 10.0 |
| Water | 27.00 |
| Aluminum hydroxide | 26.0 |
| Micronized silica | 10.0 |
| Glycerin | 22.0 |
| Polyoxyethylene polymer (molecular weight about 2,000,000) | 1.8 |
| Polyoxyethylene lauryl ether | 2.0 |
| Spearmint oil | 0.9 |
| Methyl salicylate | 0.1 |
| Methyl parahydroxybenzoate | 0.05 |
| Saccharin | 0.15 |

[1] Equivalent to 4.1% strontium ion concentration.

EXAMPLE 4

(*"Liquid" Toothpaste*)

| | Percent |
|---|---|
| Strontium bromide.6 $H_2O$ | [1] 20.0 |
| Water | 63.6 |
| Micronized silica | 10.0 |
| Methylcellulose | 2.0 |
| Methyl parahydroxybenzoate | 0.07 |
| Propyl parahydroxybenzoate | 0.03 |
| Polyoxyethylene sorbitan monostearate | 3.0 |
| Spearmint oil | 0.7 |
| Peppermint oil | 0.3 |
| Saccharin | 0.3 |

[1] Equivalent to 4.9% strontium ion concentration.

All of the above mentioned compositions are adequate cleansers for the human dentition and may be used for the ordinary purposes of removing superficial stains and food particles from and between the teeth, and for refreshing, and sweetening the mouth. They differ from usual toothpaste formulations, however, in that in the presence of water contained in the toothpaste carrier, they release strontium ions which can contact and adsorb on the organic structure of dentin and thereby exert a protective effect against the transmission of sensory impulses from the exterior surfaces of the teeth to the dental pulp.

It should be noted that in the examples given above that the various ingredients thereof may be substituted in whole or in part by one or more of the similarly functioning substances earlier set forth and that the concentrations of these ingredients may be varied within the ranges earlier indicated.

While there has been described preferred embodiments of the present invention, it is apparent that numerous alterations, omissions and additions may be made without departing from the spirit thereof.

I claim:

1. A water-containing toothpaste comprising a substantially stable solution of a non-toxic, water-soluble ionic strontium compound and a surface-active wetting agent compatible with strontium ions in an aqueous solution, said toothpaste being characterized by the substantial absence of substances which precipitate said strontium.

2. The toothpaste of claim 1, wherein said surface acting wetting agent is selected from the class consisting of polyoxyethylene partial esters of polyhydric fatty acid derivatives, polyoxyethylene polyoxypropylene condensates, polyoxyethylene-fatty alcohol ethers and fatty acid N-methyl taurine condensates.

3. The toothpaste of claim 1, including a polishing agent selected from the class consisting of strontium phosphate, strontium carbonate, micronized silica and aluminum hydroxide.

4. The toothpaste of claim 1, wherein said strontium compound is selected from the class consisting of strontium chloride, strontium acetate, strontium bromide, strontium lactate, strontium iodide, strontium nitrate and strontium salicylate.

5. The dentifrice of claim 1, including a bodying agent selected from the class consisting of methylcellulose, hydroxyethylcellulose and polyoxyethylene polymers.

6. A water-containing toothpaste comprising a substantially stable solution of a non-toxic, water-soluble ionic strontium compound and a surface-active wetting agent compatible with strontium ions in an aqueous solution, said strontium ions constituting between 0.5% and 10% by weight of said toothpaste, said toothpaste being characterized by the substantial absence of substances which precipitate said strontium.

7. A toothpaste in accordance with claim 6, wherein said wetting agent constitutes between 0.5% and 5% by weight of said toothpaste.

8. A toothpaste in accordance with claim 7, including between 10% and 50% by weight of said toothpaste of a polishing agent compatible with strontium ions in an aqueous solution.

9. A water-containing toothpaste comprising a substantially stable solution of an ionic strontium compound selected from the class consisting of strontium chloride, strontium acetate, strontium bromide, strontium lactate, strontium iodide, strontium nitrate and strontium salicylate, a surface active wetting agent compatible with strontium ions in an aqueous solution and selected from the class consisting of polyoxyethylene partial esters of polyhydric fatty acid derivatives, polyoxyethylene polyoxypropylene condenastes, polyoxyethylene-fatty alcohol ethers and fatty acid N-methyl taurine condensates, and a polishing agent compatible with strontium ions in an aqueous solution, said strontium ion constituting between 0.5% and 10% by weight of said toothpaste, said toothpaste being characterized by the substantial absence of substances which precipitate said strontium.

10. A toothpaste in accordance with claim 9, including a bodying agent compatible with said strontium ion.

11. A water-containing toothpaste comprising a solution of a non-toxic strontium compound providing strontium ions, a surface active wetting agent, a polishing agent, and characterized by the substantial absence of substances incompatible with the strontium ions in an aqueous solution.

References Cited in the file of this patent

UNITED STATES PATENTS

| | | |
|---|---|---|
| 834,676 | Luyties | Oct. 30, 1906 |
| 1,018,240 | Foregger | Feb. 20, 1912 |
| 1,567,974 | Monroe | Dec. 29, 1925 |
| 1,943,467 | Bley | Jan. 16, 1934 |
| 2,946,725 | Norris | July 26, 1960 |
| 2,975,102 | Matsumura | Mar. 14, 1961 |

OTHER REFERENCES

Sisley: Encyclopedia of Surface Active Agents, 1952, Chemical Publishing Co., New York, N.Y., pages 29 and 30.

Remington's Practice of Pharmacy, 1956, The Mack Publishing Co., Easton, Pa., page 727.

Disclaimer 3,122,483.—*Murray W. Rosenthal*, East Brunswick, N.J. STRONTIUM ION TOOTHPASTE. Patent dated Feb. 25, 1964. Disclaimer filed Nov. 20, 1970, by the assignee, *Block Drug Company, Inc.*

Hereby enters this disclaimer to claims 1 through 5 and 11 of said patent.

[*Official Gazette March 2, 1971.*]